US012709932B2

(12) United States Patent
Ozawa et al.

(10) Patent No.: US 12,709,932 B2
(45) Date of Patent: Aug. 18, 2026

(54) OPENING/CLOSING CONTROL DEVICE

(71) Applicants: Koji Ozawa, Aichi (JP); Hiroshi Ueno, Aichi (JP)

(72) Inventors: Koji Ozawa, Aichi (JP); Hiroshi Ueno, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 412 days.

(21) Appl. No.: 18/395,628

(22) Filed: Dec. 25, 2023

(65) Prior Publication Data

US 2024/0209670 A1 Jun. 27, 2024

(30) Foreign Application Priority Data

Dec. 27, 2022 (JP) ................................ 2022-210081

(51) Int. Cl.
*E05F 15/41* (2015.01)

(52) U.S. Cl.
CPC ......... *E05F 15/41* (2015.01); *E05Y 2400/564* (2013.01); *E05Y 2900/532* (2013.01)

(58) Field of Classification Search
CPC ........... E05F 15/41; E05F 15/77; E05F 15/70; E05Y 2400/564; E05Y 2900/532
See application file for complete search history.

(56) References Cited

U.S. PATENT DOCUMENTS

| | | | | |
|---|---|---|---|---|
| 7,808,197 | B2 | 10/2010 | Kimura et al. | |
| 2008/0001563 | A1* | 1/2008 | Kimura | B60J 5/10 318/280 |
| 2012/0323370 | A1 | 12/2012 | Nishikibe et al. | |
| 2022/0094282 | A1* | 3/2022 | Jordan | H02P 3/06 |

FOREIGN PATENT DOCUMENTS

| | | | |
|---|---|---|---|
| JP | 2002295127 | A | 10/2002 |
| JP | 2006307636 | A | 11/2006 |
| JP | 2015031108 | A | 2/2015 |

* cited by examiner

*Primary Examiner* — Charles Cai
(74) *Attorney, Agent, or Firm* — HAUPTMAN HAM, LLP

(57) ABSTRACT

An opening/closing body control device is provided that can quickly detect pinching even when the opening/closing body is bent due to the pinching.
An opening/closing body control device includes a motor drive unit that drives a motor for opening and closing the opening/closing body, and a control unit that controls an operation of the motor drive unit. The opening/closing control device includes a difference value calculator that calculates a current difference value that is a difference between a present value and a past value of a motor current, a differential value calculator that calculates a differential value of the current difference value, an adder that adds the current difference value and the differential value, and a pinching detection unit that judges whether or not pinching occurs at the opening/closing body based on a comparison result between the added value and a threshold.

9 Claims, 16 Drawing Sheets

OPENING/CLOSING CONTROL DEVICE

CROSS-REFERENCE TO RELATED APPLICATIONS

This application is based upon and claims the benefit of priority from Japanese Patent Application No. 2022-210081, filed on Dec. 27, 2022; the entire contents of which are incorporated herein by reference.

FIELD

One or more embodiments of the present invention relates to a device for controlling an opening/closing body such as a back door provided in a vehicle, and particularly, to a technique for quickly detecting a pinching that occurs as the opening/closing body opens or closes.

BACKGROUND

FIG. 11 is a schematic structural diagram illustrating the operation of a back door (also called a tailgate). The back door 51 is installed at the rear of a vehicle 50, such as a four-wheeled vehicle, and its upper end is supported by a rotary shaft 52, which can rotate around the rotary shaft 52. The back door 51 automatically opens by rotating in a counterclockwise direction based on a predetermined operation. The back door 51 automatically closes by rotating in a clockwise direction based on a predetermined operation. A fully-closed position is indicated by 51*a*. A fully-opened position is indicated by 51*b*.

FIG. 12 shows a simplified mechanical diagram for opening and closing the back door 51. A door opening/closing mechanism 5 driven by a motor 4 is connected to the back door 51. When the motor 4 rotates in the forward direction, an arm 53 of the door opening/closing mechanism 5 extends in a direction 'a' in conjunction with the motor 4, and the back door 51 opens in a X direction. When the motor 4 rotates in a reverse direction, the arm 53 of the door opening/closing mechanism 5 retracts in a direction 'b', and the back door 51 closes in a direction Y.

As shown in FIG. 13, when the back door 51 is performing the closing operation, an obstacle P may be pinched between the back door 51 and a vehicle body. As shown in FIG. 14, when the back door 51 is performing the opening operation, the back door 51 may hit an obstacle Q, causing the back door 51 to be pinched between the vehicle body and the obstacle Q.

If such pinching occurs, not only will the opening and closing operation of the back door 51 be hindered, but the obstacles P and Q may be damaged or destroyed. In particular, if the obstacles P and Q are part of a human body, it is preferable for safety that no pinching occurs. Therefore, when a pinching occurs, it must be detected immediately and the motor 4 must be stopped or reversed to eliminate the pinching condition. In JP-A-2015-031108, JP-A-2013-002110, JP-A-2008-002089, JP-A-2006-307636 and JP-A-2002-295127, techniques for detecting the pinching are described.

In JP-A-2015-031108, a difference between a current flowing through a motor and a reference current is obtained, and when an integrated value of the difference exceeds a threshold value, it is judged that a pinching has occurred. In JP-A-2013-002110, when an integrated value of a difference between a past value and a present value of a motor current or a differential value between a past value and a present value falls below a specified value, it is judged that a disturbance has occurred and the threshold for detecting pinching is changed. In JP-A-2008-002089, a speed difference between a motor rotation speed and a target speed is calculated, a deviation is calculated by integrating and averaging a change in the speed difference between present time and last time, and a pinching is detected by comparing the deviation with a threshold value. In JP-A-2006-307636, after a start of pinching is detected, if an amount of change in a motor's rotation speed exceeds a threshold value, a pinching is determined. In JP-A-2002-295127, an amount of change in an angular velocity of a motor is calculated, and a pinching is detected by comparing the amount of change in angular velocity with a threshold value.

SUMMARY

A back door of a vehicle is not a perfectly rigid body and bends due to force applied from outside. In particular, if a position at the back door 51 where the driving force of the motor 4 acts (see FIG. 12) and a position where the pinching occurred (see FIG. 13 and FIG. 14) are misaligned, the back door 51 will bend due to force in the opposites direction generated at these positions. Details are described below.

FIG. 15 shows a mechanical model diagram when a pinching occurs. When the pinching occurs, the back door 51 is subjected to a torque of motor 4 and a load due to the pinching, both acting in opposite directions. When these forces are applied out of alignment, the back door 51 bends. In this case, the motor 4 and the back door 51 are coupled by a spring with a spring constant K1, and a pinching point and the back door 51 are coupled by a spring with a spring constant K2. The spring constant K1 is determined by the rigidity of the back door 51. The spring constant K2 is determined by the nature of the object (obstacle) being pinched. In the opening/closing operation of the back door where such a mechanical model is established, a detection of the pinching is delayed considerably after the pinching occurs. This will be described below.

FIG. 16 is a diagram showing a time change of a current difference value of a motor current (the difference between a present value and a past value) when a pinching is detected. When the pinching occurs, the motor current increases as the motor torque increases. The difference value of the motor current increases accordingly. In this case, if the back door 51 does not bend, the current difference value changes linearly with time, as shown by the dashed line. Then, the pinching is detected at the time 'ta' when the current difference value reaches a predetermined threshold value Th.

On the other hand, if the back door 51 is bent, the current difference value does not change linearly with time. The current difference value changes slowly from the rising edge, as shown by the solid line. This is because the bend of the back door 51 causes a smaller change in the torque of the motor 4 applied to the back door 51, and the motor current, which has a proportional relationship with the torque, shows a slow change. As a result, the time 'tb' when the current difference value reaches the threshold value Th, i.e., the time when the pinching is detected, is later than in the case where the back door 51 is not bent. In other words, the time required to detect the pinching becomes longer.

An object of an aspect of the present invention is to provide an opening/closing control device that can quickly detect a pinching even when an opening/closing body is bent due to the pinching.

The opening/closing control device of the present invention has a motor drive unit that drives a motor for opening and closing an opening/closing body, and a control unit that controls the operation of the motor drive unit.

In the first aspect of the invention, the control unit includes a difference value calculation unit that calculates a current difference value, which is the difference between the present value and the past value of the motor current flowing in the motor, a differential value calculation unit that calculates a differential value of the current difference value calculated by the difference value calculation unit, an adding unit that adds the current difference value and the differential value, and a pinching detection unit that judges whether or not there is a pinching at the opening/closing body based on a comparison result of the added value calculated by the addition unit and a predetermined threshold. The adding unit adds the current difference value and the differential value, and based on the comparison result between the added value calculated in the adding unit and a predetermined threshold value, judges whether or not there is pinching at the opening/closing body.

In the second aspect of the invention, the control unit is equipped with a difference value calculation unit that calculates a speed difference value, which is the difference between the present value and the past value of the motor speed, a differential value calculation unit that calculates a differential value of the speed difference value calculated by this difference value calculation unit, an adding unit that adds the speed difference value and the differential value, and a pinching detection unit. The pinching detection unit judges whether or not there is pinching at the open/closed body based on the result of a comparison between the added value calculated in the adding unit and a predetermined threshold value.

According to this type of opening/closing control device, by adding the differential value of the differential value to the differential value of the motor current or motor speed, the degree of change of the added value (differential value+differential value of the differential value) is larger than the differential value. Therefore, by comparing this added value with the threshold value, it is possible to detect a pinching at an earlier point in time than the conventional pinching detection point, thereby reducing time until the pinching is detected.

In the first aspect of the invention, the adding unit may add the current differential value and the differential value multiplied by a predetermined coefficient. The differential value may be a differential value differentiated by time or a differential value differentiated by the position of the opening/closing body.

In the first form of the invention, instead of the motor current, the motor torque, which is in a proportional relationship with the motor current, may be used. In this case, the presence or absence of pinching is determined by comparing the differential value of the motor torque and its differential value, which is added, with a threshold value.

In the second aspect of the invention, the adding unit may add the velocity differential value and the differential value multiplied by a predetermined coefficient. The differential value may be a differential value obtained by differentiating the speed differential value by time, or a differential value obtained by differentiating the speed differential value by the position of the opening/closing body.

The opening/closing body in the present invention is typically a rotary opening/closing body, i.e., the opening/closing body that is supported at one end by a rotary shaft and rotates around the shaft by a motor. An example of such a rotary actuator is the back door at the rear of a vehicle. In this case, the motor rotates the back door via an opening/closing mechanism connected to the back door.

DETAILED DESCRIPTION

Figure 1:
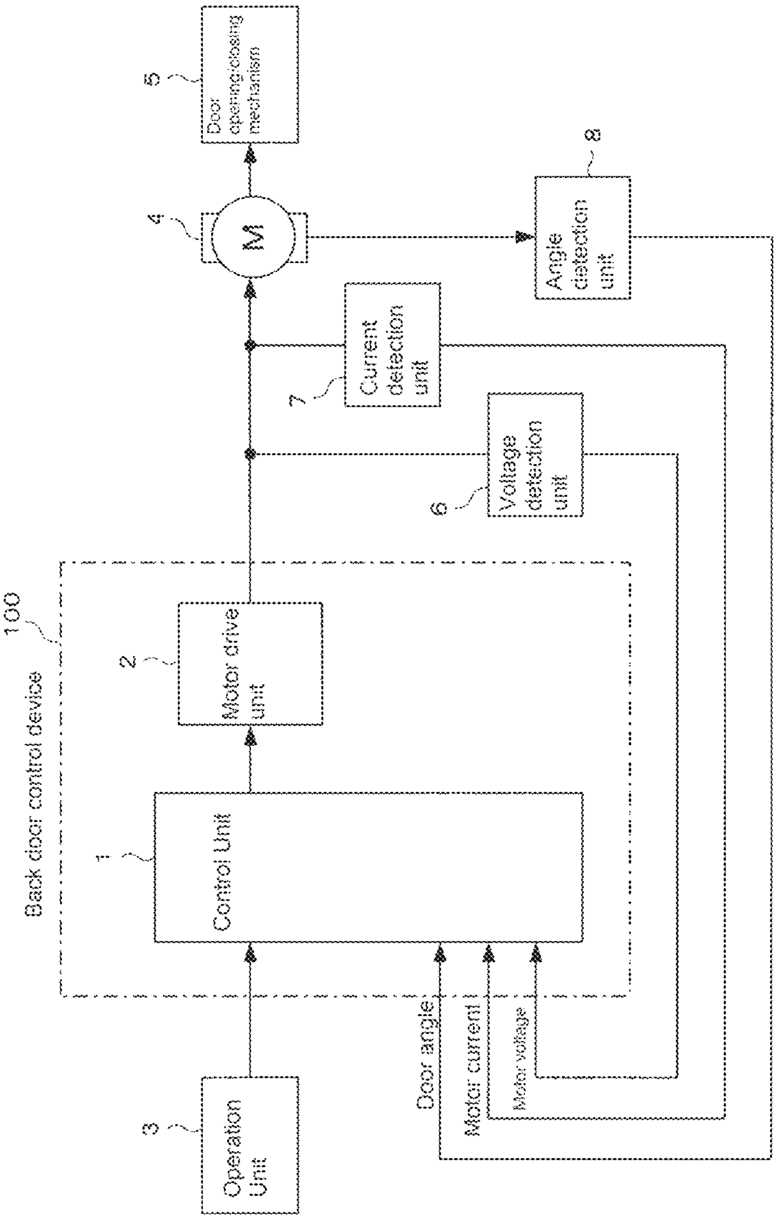
FIG. 1 is a system diagram for controlling an opening and closing of a back door.

Embodiments of the present invention will be described with reference to the drawings. Throughout the drawings, the same or corresponding parts are denoted by the same reference numerals. Hereinafter, a back door 51 of a vehicle illustrated in FIGS. 11 to 14 will be described as an example of an opening/closing body.

FIG. 1 is a system configuration diagram for controlling the opening and closing of the back door 51. A back door control device 100 is an example of an opening/closing unit and is equipped with a control unit 1 and a motor drive unit 2. The control unit 1 outputs control signals to control the operation of the motor drive unit 2 based on an operation unit 3 in a vehicle or an electronic key. The motor drive unit 2 outputs a drive signal to rotate or stop a motor 4 based on the control signal from the control unit 1. The motor 4 rotates forward, reverses, or stops according to the drive signal from the motor drive unit 2. Connected to the motor 4 is a door opening/closing mechanism 5 that mechanically opens and closes the back door 51 (see FIG. 12). As mentioned above, an arm 53 of the door opening/closing mechanism 5 extends or retracts in conjunction with the rotation of the motor 4 to open or close the back door 51.

A voltage detection unit 6 and a current detection unit 7 are provided on an output side of the motor drive unit 2. The voltage detection unit 6 detects a motor voltage applied to the motor 4 from the motor drive unit 2. The current detection unit 7 detects a motor current flowing in the motor 4. The motor voltage detected by the voltage detection unit 6 is input to the control unit 1. The motor current detected by the current detection unit 7 is input to the control unit 1.

The motor 4 is equipped with an angle detection unit 8. The angle detection unit 8 consists of a pulse encoder, for example, and outputs pulses synchronized with the rotation of the motor 4. A total number of the pulses represents a door angle when the back door 51 opens or closes. The door angle detected by the angle detection unit 8 is input to the control unit 1.

Figure 2:
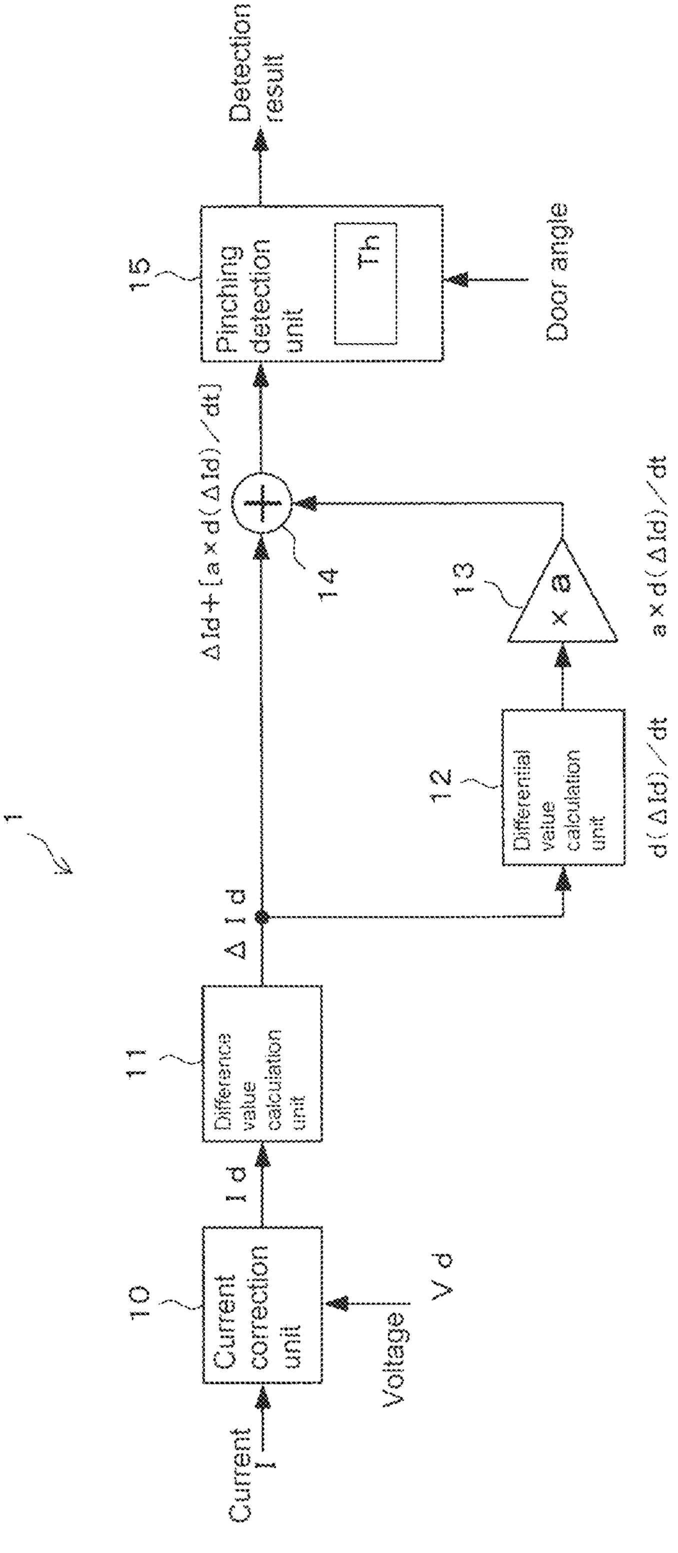
FIG. 2 is a diagram showing a first embodiment of a specific configuration of a control unit.

FIG. 2 is a diagram showing a first embodiment of a specific configuration of the control unit 1. Here, only the blocks related to pinching detection are shown (the same applies to FIGS. 5, 7, and 9 described later). The control unit 1 is equipped with a current correction unit 10, a difference value calculation unit 11, a differential value calculation unit 12, a multiplier 13, an adder 14, and a pinching detection unit 15.

The current correction unit 10 is an electric circuit that corrects a variation in the motor current caused by a variation in the motor voltage. The current correction unit 10 corrects the motor current Id detected by the current detection unit 7 in FIG. 1 according to the motor voltage Vd detected by the voltage detection unit 6. The corrected motor current Id is input to the difference value calculation unit 11.

Figure 3A:
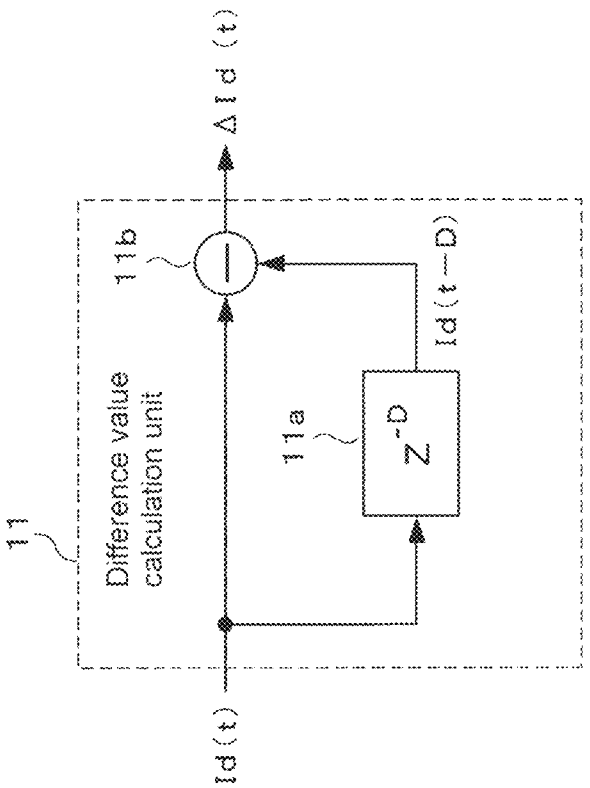
FIG. 3A is a diagram showing a difference value calculation unit.
Figure 3B:
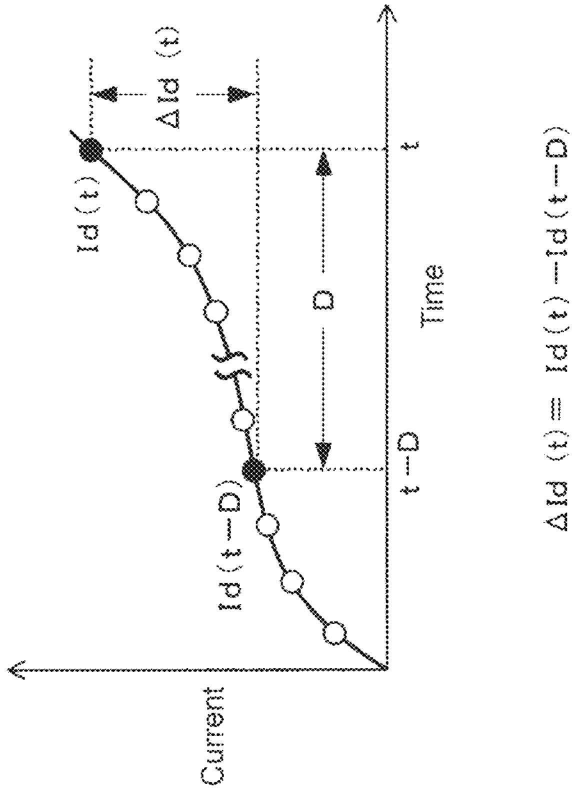
FIG. 3B is a graph showing changes in a motor current over time.

The difference value calculation unit 11 is an electric circuit that calculates the current difference value ΔId. The current difference value ΔId is the difference between the present value of the motor current Id and the past value of the motor current Id. In detail, as shown in FIG. 3A, the difference value calculation unit 11 consists of a delay circuit 11*a* and a subtractor 11*b*. FIG. 3B shows a time change of the motor current Id. The motor current Id(t) input to the difference value calculation unit 11 is a present value(time t) shown in FIG. 3B. On the other hand, the delay circuit 11*a* holds a past current value Id(t−D) (time (t−D), which is shown in FIG. 3B, going back by a predetermined period D from the time t. The subtractor 11*b* calculates the current difference value ΔId(t) by subtracting the past current value Id(t−D) from the present current value Id(t) of the motor current Id. The calculation is shown in the following equation.

$$\Delta Id(t) = Id(t) - Id(t - D)$$

In FIG. 2, the current difference value ΔId calculated by the difference value calculation unit 11 is input to the adder 14 and also to the differential value calculation unit 12. The differential value calculation unit 12 differentiates the current difference value ΔId by time and calculates a differential value d(ΔId)/dt of the current difference value. The calculated differential value d(ΔId)/dt is input to the multiplier 13. The multiplier 13 multiplies the differential value d(ΔId)/dt by a predetermined coefficient 'a' to calculate a×d(ΔId)/dt. In principle, the value of the coefficient 'a' should be a=1, but in practice, an appropriate value may be selected by trial and error in an experimental process of the pinching detection. The "differential value" in the present invention includes the differential value multiplied by such a coefficient 'a'.

The multiplication result of the multiplier 13 is input to the adder 14. The adder 14 adds the current difference value ΔId calculated by the difference value calculation unit 11 and a×d(ΔId)/dt calculated by the multiplier 13 to calculate ΔId+[a×d(ΔId)/dt]. The calculated value is input to the pinching detection unit 15 and serves as the basis for judging whether or not a pinching has occurred. In the following, a=1 for simplicity, and the pinching detection unit 15 detects the pinching based on ΔId+d(ΔId)/dt.

In detail, the pinching detection unit 15 compares ΔId+d(ΔId)/dt (i.e., the sum of the current difference value and the differential of the current difference value) with a predetermined threshold value Th. If ΔId+d(ΔId)/dt>Th, then it judges that a pinching has occurred. If ΔId+d(ΔId)/dt≤Th, then it judges that a pinching has not occurred. Alternatively, if ΔId+d(ΔId)/dt≥Th, then it judges that a pinching has occurred, and if ΔId+d(ΔId)/dt<Th, then it judges that a pinching has not occurred.

Figure 4:
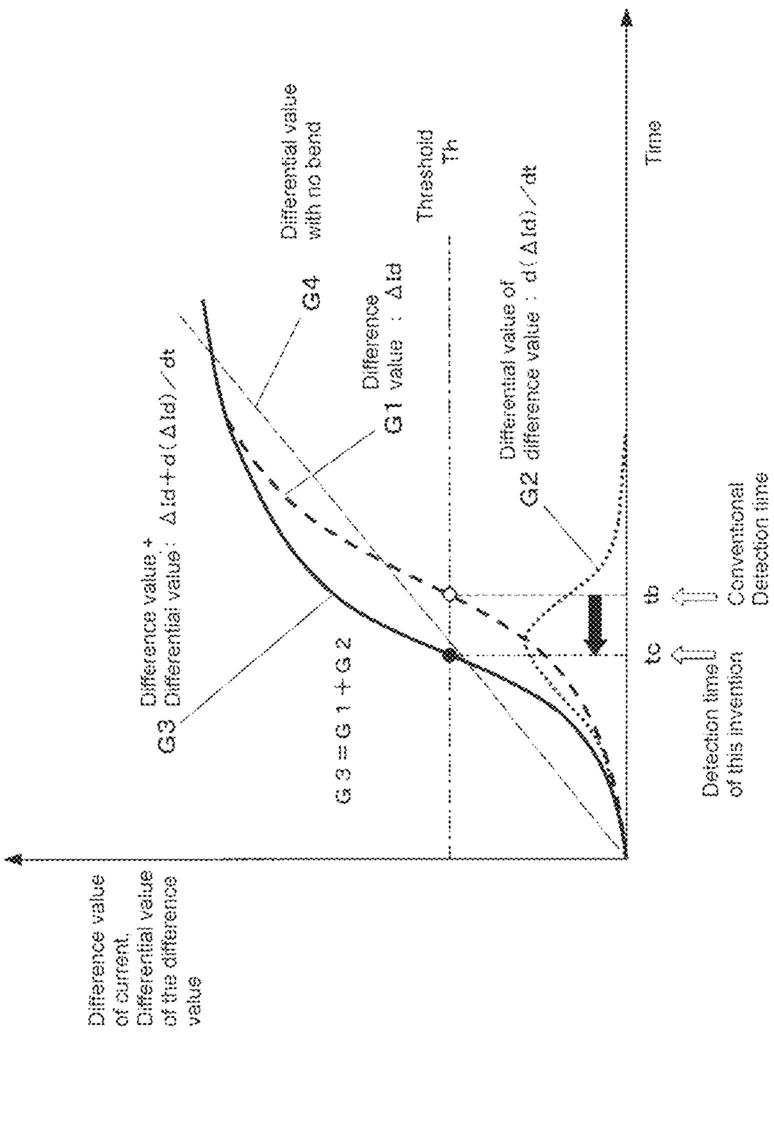
FIG. 4 is a graph for illustrating a pinching detection method according to an aspect of the present invention.

FIG. 4 is a diagram for explaining a pinching detection method according to an aspect of the invention. FIG. 4 illustrates changes in various calculated values when a pinching occurs at the back door 51. A change in the difference value of the motor current, ΔId, calculated by the difference value calculation unit 11 is represented by a curve G1. A change in the differential value d(ΔId)/dt of the differential value calculated by the differential value calculation unit 12 is represented by a curve G2. A sum of the curve G1 and the curve G2, i.e., the addition of the difference value and the differential value ΔId+d(ΔId)/dt, is represented by a curve G3. A difference value of the motor current when there is no bend in the back door 51 is represented by a curve G4. The curve G4 is the same as the dashed line in FIG. 16.

Figure 16:
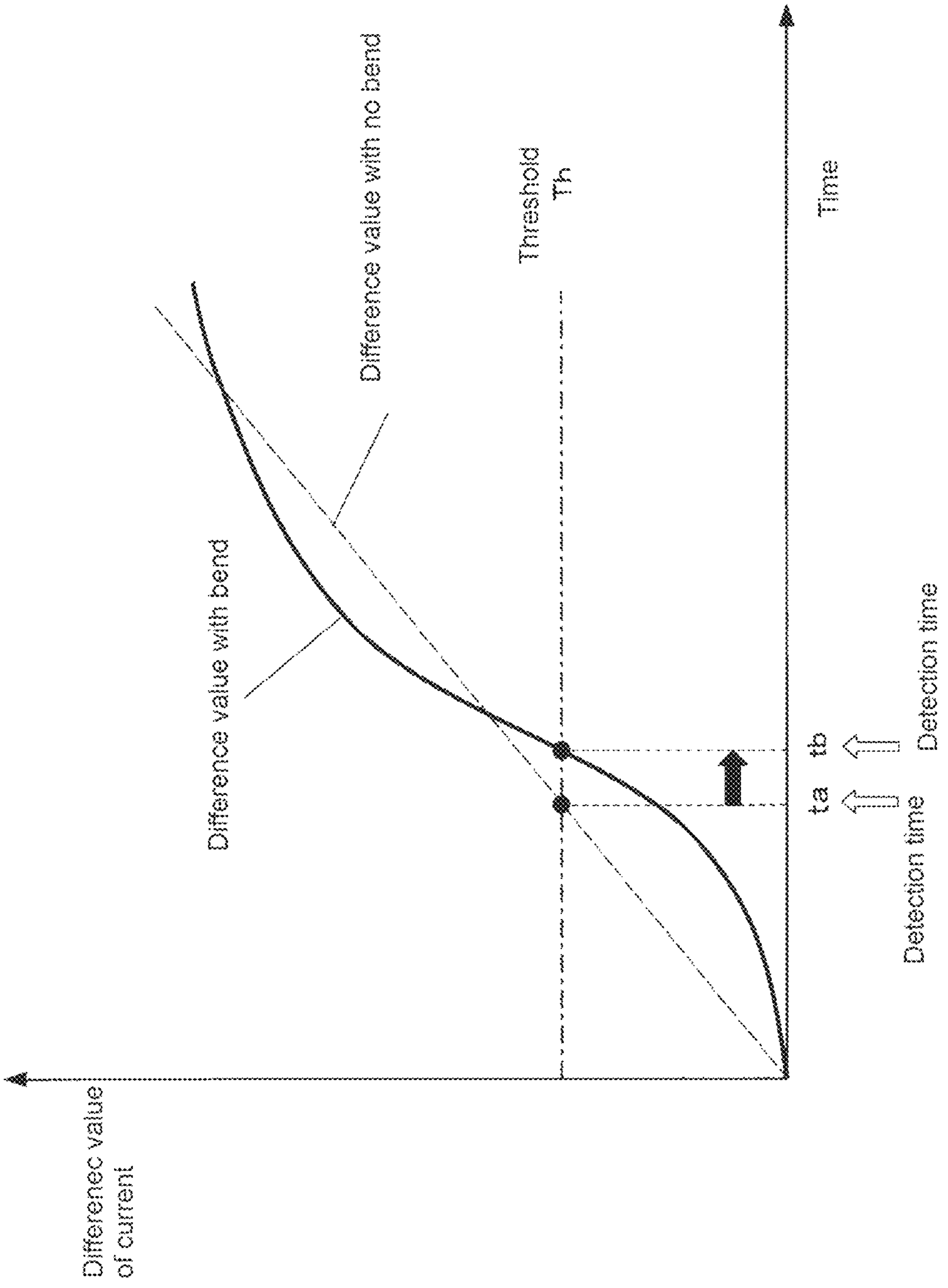
FIG. 16 is a graph for explaining a conventional pinching detection.

As can be seen from FIG. 4, in a conventional method of comparing the difference value ΔId of the motor current in the curve G1 with the threshold value Th, the change in the difference value ΔId is gradual, which delays a detection timing tb of the pinching, as also explained in FIG. 16. In contrast, in the present invention, by adding the differential value d(ΔId)/dt of the curve G2 to the difference value ΔId of the curve G1, the degree of the change of the added value, ΔId+d(ΔId)/dt of the curve G3, is greater than that of the difference value ΔId of the curve G1, and a rise is more steep. Therefore, by comparing the curve G3 with the threshold value Th, a timing until the curve G3 reaches the threshold value Th is shortened, and as a result, the pinching can be detected at an earlier timing tc than the conventional pinching detection timing tb.

The pinching detection unit 15 outputs a detection result according to whether or not there is pinching. If the detection result is "pinched," the control unit 1 outputs a control signal to the motor drive unit 2 to stop or reverse the motor 4. The motor drive unit 2 receives the control signal and stops or reverses motor 4. This stops the back door 51. As a result, the back door 51 reversing in the reverse direction, the state of being pinched by the obstacle is eliminated.

As shown in FIG. 2, the door angle of the back door 51 detected by the angle detection unit 8 is input to the pinching detection unit 15. This is the same condition as when a pinching occurs, because when the back door 51 reaches the fully-closed position 51*a* in FIG. 11, the motor current increases rapidly along with the torque of the motor 4. This is to prevent misjudgment of pinching at this time. In other words, the pinching detection unit 15 does not judge that a pinching has occurred if the back door 51 is in the fully-closed position 51*a* even if the added value of the difference value of the motor current and its differential value reaches the threshold value Th.

Figure 5:
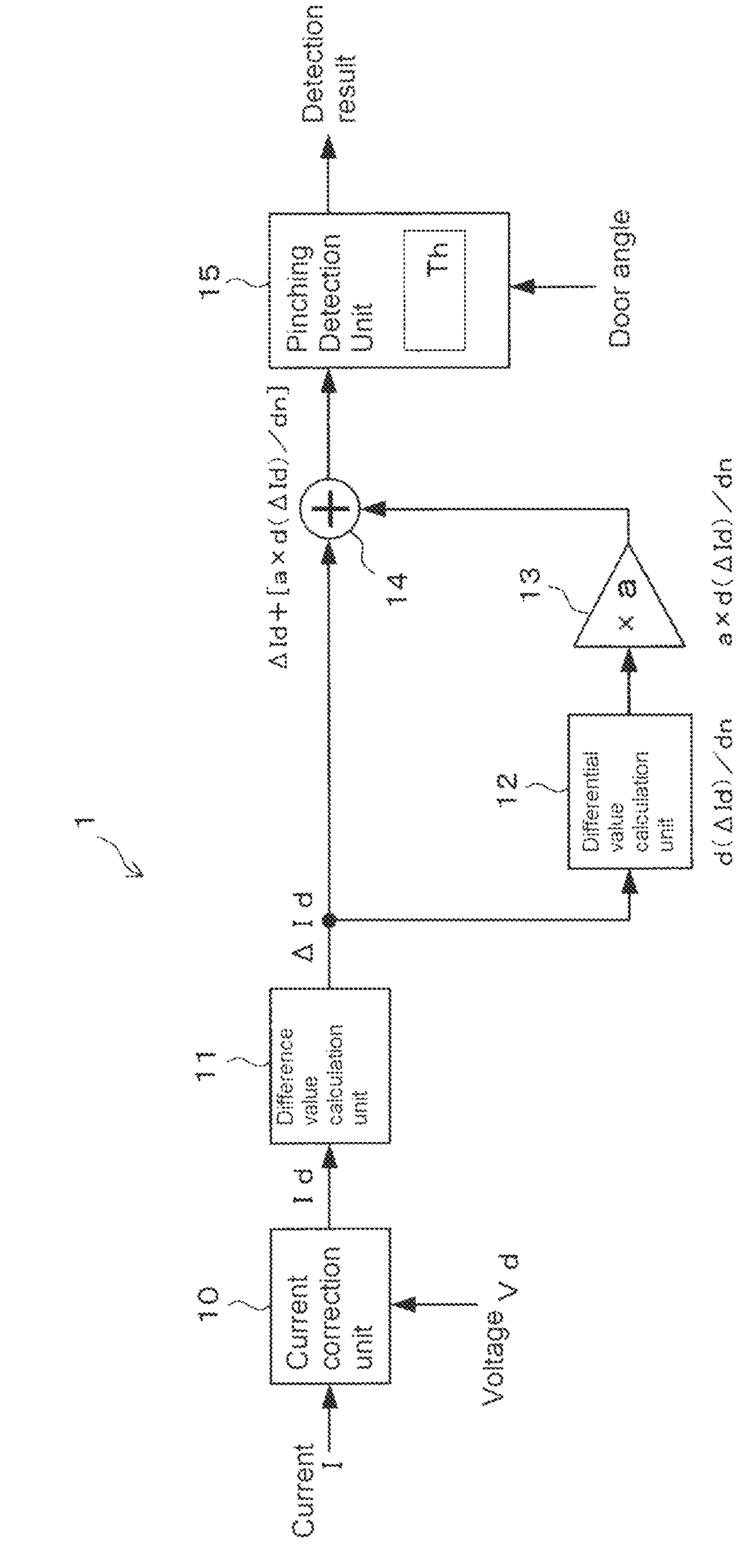
FIG. 5 is a diagram showing a second embodiment of a specific configuration of a control unit.

FIG. 5 shows a second embodiment of a specific configuration of control unit 1. As in FIG. 2 (the first embodiment), control unit 1 is equipped with the current correction unit 10, the difference value calculation unit 11, the differential value calculation unit 12, the multiplier 13, the adder 14, and the pinching detection unit 15, but a calculations of the current difference value and the differential value of the difference value differ from those in FIG. 2. The following is a specific explanation.

Figure 6A:
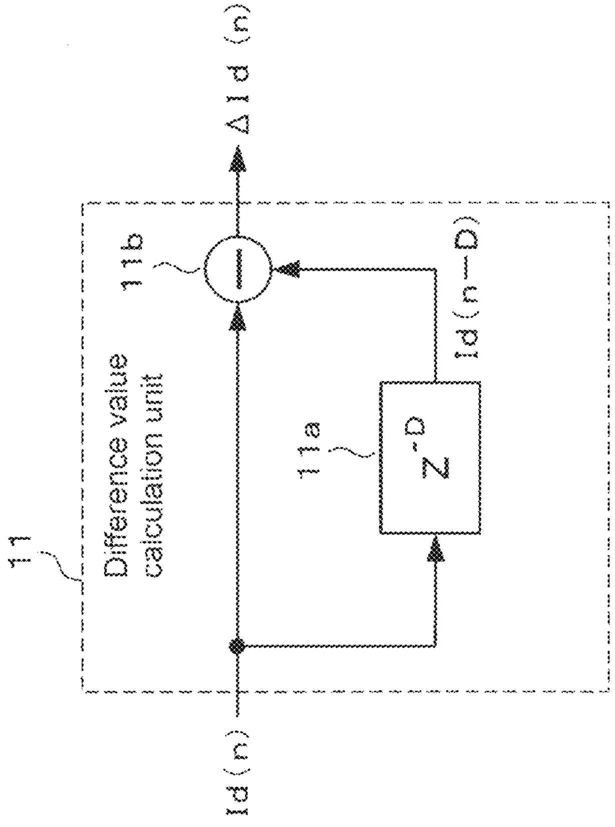
FIG. 6A is a diagram showing details of a difference value calculation unit in FIG. 5.
Figure 6B:
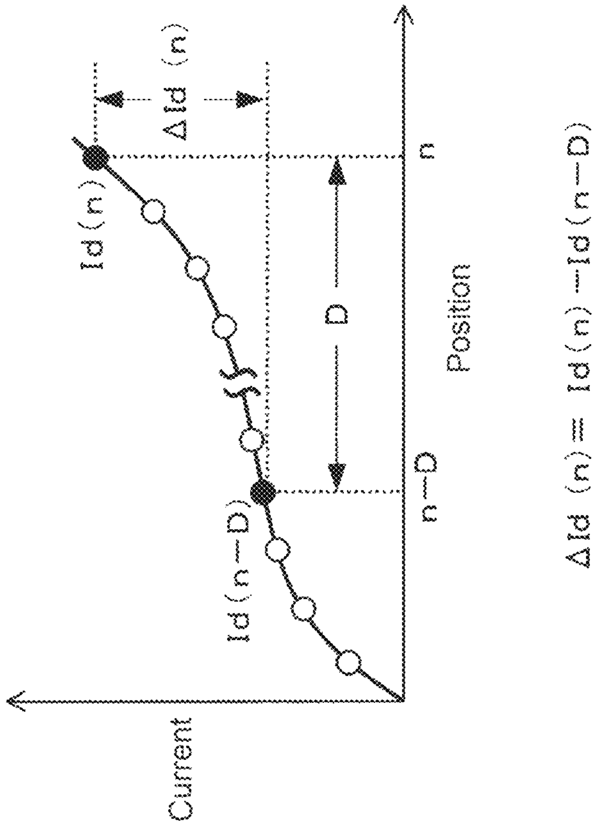
FIG. 6B is a graph showing changes in the motor current over a position of an opening/closing body.

In FIG. 2, as explained in FIG. 3, the difference value calculation unit 11 calculated the current difference value ΔId(t) by subtracting the past value Id(t−D) at the time t−D from the present value Id(t) at the time t of the motor current Id. In contrast, in FIG. 5, as shown in FIG. 6, the difference value calculation unit 11 used a position of the back door 51 instead of time, and subtracted the past value Id(n−D) at a position n−D from the present value Id(n) of the motor current Id at the position n, A current difference value ΔId (n) is calculated. The position here is the value corresponding to the door angle of the back door 51 (the total number of pulses mentioned above) detected by the angle detection unit 8 in FIG. 1.

In FIG. 2, the differential value calculation unit 12 differentiated the current difference value ΔId by the time to calculate the differential value d(ΔId)/dt. In FIG. 5, the differential value calculation unit 12 calculates the differential value d(ΔId)/dn by differentiating the current difference value ΔId by the position. Therefore, the multiplier 13 performs an operation to multiply the differential value d(ΔId)/dn by a coefficient 'a'. The adder 14 performs an operation to add the current difference value ΔId calculated by the difference value calculation unit 11 and a×d(ΔId)/dn calculated by the multiplier 13. Therefore, assuming a=1, the pinching detection unit 15 compares ΔId+d(ΔId)/dn with the threshold value Th to judge whether or not a pinching has occurred.

In the second embodiment, as in the first embodiment, the difference value ΔId of the motor current is added to the differential value d(ΔId)/dn, so that the added value ΔId+d(ΔId)/dn has a greater degree of change than the difference value ΔId. Therefore, by comparing the added value with the threshold value Th, it is possible to detect a pinching at an earlier timing than the conventional pinching detection timing, thereby reducing the time to detect the pinching.

Figure 7:
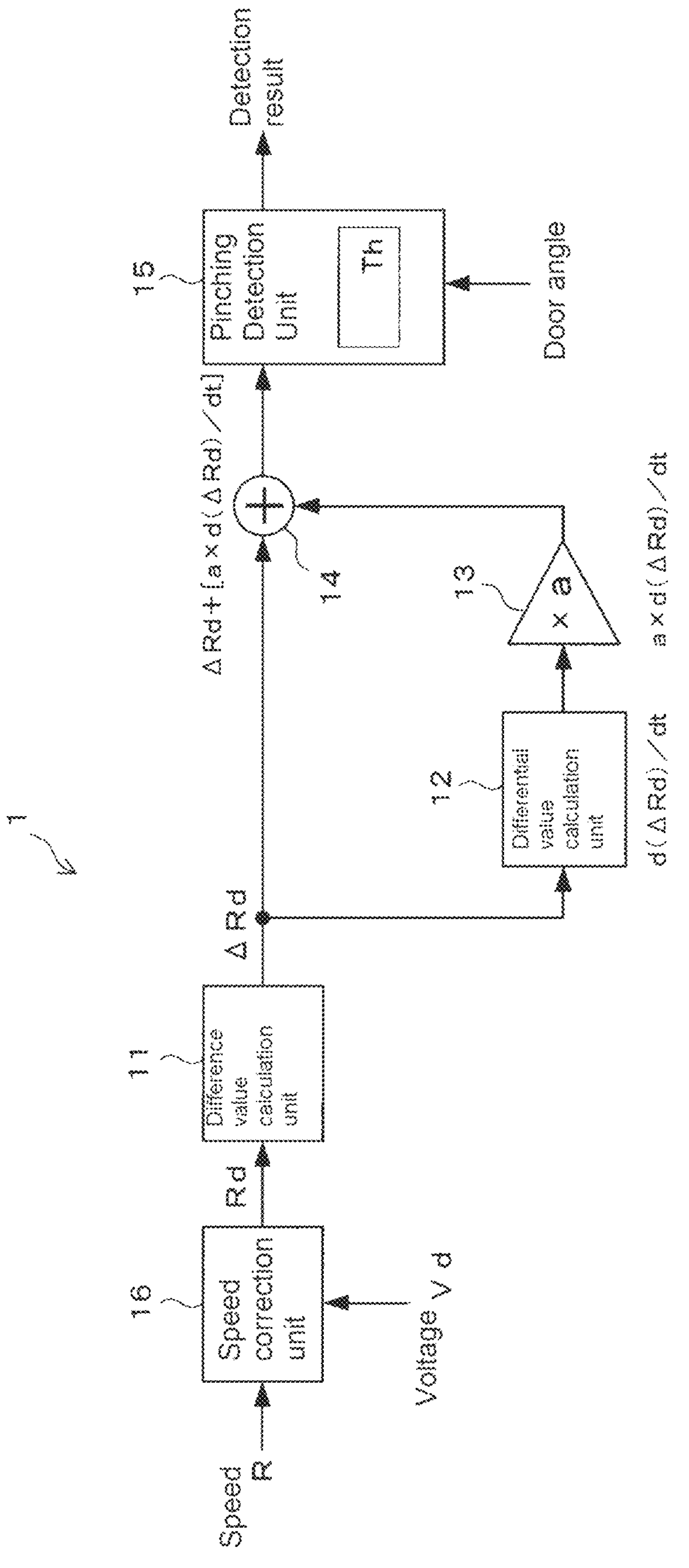
FIG. 7 is a diagram showing a third embodiment of a specific configuration of the control unit.

FIG. 7 shows a third embodiment of the specific configuration of control unit 1. As in FIG. 2 (the first embodiment), the control unit 1 is equipped with the difference value calculation unit 11, the differential value calculation unit 12, the multiplier 13, the adder 14, and the pinching detection unit 15. Instead of the current correction unit 10 in FIG. 2, a speed correction unit 16 is provided. In addition, calculations of the difference value and the differential of the difference value are different from those in FIG. 2. In FIG. 2, the difference value of current and the differential value of the difference value were calculated based on the motor current I. In FIG. 7, the difference value and the difference value of the differential value are calculated based on a motor speed R (a rotation speed of the motor 4). The following is a specific explanation.

The speed correction unit 16 is an electric circuit that corrects for variations in the motor speed caused by variations in the motor voltage. The speed correction unit 16 corrects the motor speed Rd detected by the speed detection unit, not illustrated in the FIG. 7, according to the motor voltage Vd detected by the voltage detection unit 6 in FIG. 1. The corrected motor speed Rd is input to the difference value calculation unit 11.

Figure 8A:
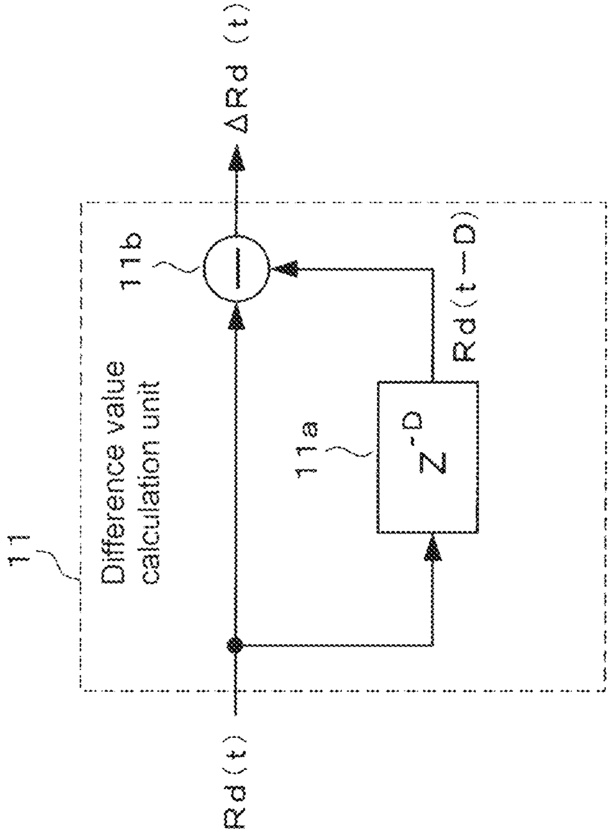
FIG. 8A is a diagram showing details of a difference value calculation unit.
Figure 8B:
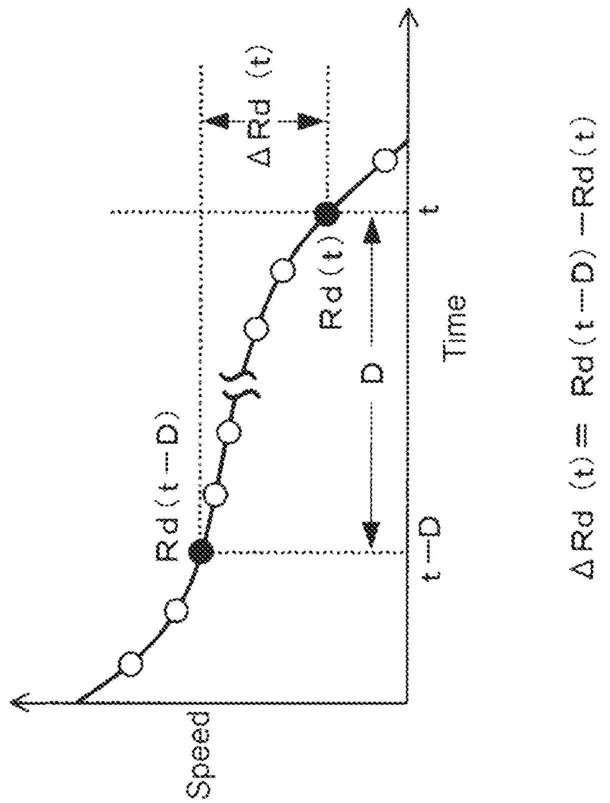
FIG. 8B is a graph showing changes in a corrected motor speed over time.

The difference value calculation unit 11 is an electric circuit that calculates a speed difference value ΔRd, which is a difference between the present value and the past value of the corrected motor speed Rd. In detail, as shown in FIG. 8A, the difference value calculation unit 11 consists of a delay circuit 11*a* and a subtractor 11*b*. FIG. 8B shows the time change of the corrected motor speed Rd. As is clear from comparison with FIG. 3B, the corrected motor speed Rd changes inversely to the motor current Id.

A corrected motor speed Rd(t) input to the difference value calculation unit 11 is the present (time t) speed value shown in FIG. 8B. On the other hand, the delay circuit 11*a* holds a corrected motor speed Rd (t−D) in the past (time (t−D), which is the time (t−D) backward by a predetermined period D from the time t) shown in FIG. 8B. The subtractor 11*b* calculates a speed difference value ΔRd(t) by subtracting the present value Rd(t) from the past value Rd(t−D) of the corrected motor speed Rd. The calculation is shown by the following equation.

$$\Delta Rd(t) = Rd(t-D) - Rd(t)$$

Returning to FIG. 7, the speed difference value ΔRd calculated by the difference value calculation unit 11 is input to the adder 14 and also to the differential value calculation unit 12. The differential value calculation unit 12 differentiates the speed difference value ΔRd by the time and calculates a differential value d(ΔRd)/dt of the speed difference value. The calculated differential value d(ΔRd)/dt is input to the multiplier 13 and multiplied by a coefficient 'a' (here a=1). The adder 14 calculates ΔRd+d(ΔRd)/dt by adding the speed differential value ΔRd calculated by the differential value calculation unit 11 and d(ΔRd)/dt calculated by the multiplier 13. The calculated value is input to the pinching detection unit 15.

The pinching detection unit 15 compares ΔRd+d(ΔRd)/dt (i.e., a sum of the speed difference value and the differential of the speed difference value) with the predetermined threshold value Th. If ΔRd+d(ΔRd)/dt>Th, it judges that a pinch has occurred. If ΔRd+d(ΔRd)/dt≤Th, it judges that no pinch has occurred. Alternatively, if ΔRd+d(ΔRd)/dt≥Th, it judges that a pinching has occurred, and if ΔRd+d(ΔRd)/dt<Th, it judges that no pinching has occurred.

In the third embodiment as described above, by adding the differential value d(ΔRd)/dt of the differential value to the difference value ΔRd of the motor speed, this added value ΔRd+d(ΔRd)/dt has a greater degree of change than the difference value ΔRd. Therefore, by comparing the added value with the threshold value Th, it is possible to detect the pinching at an earlier timing than the conventional pinching detection timing. Thereby, the time required to detect the pinching can be shortened.

Figure 9:
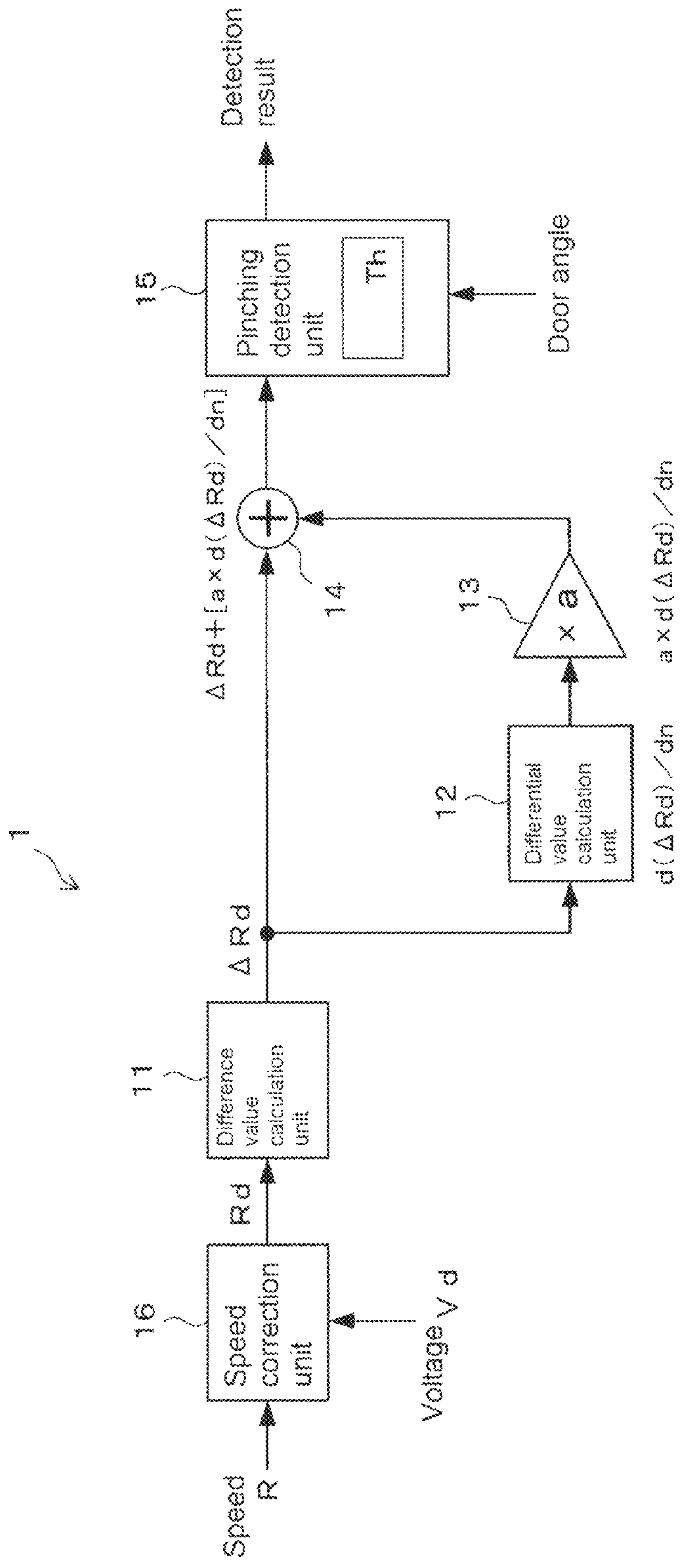
FIG. 9 is a diagram showing a fourth embodiment of a specific configuration of the control unit.

FIG. 9 shows a fourth embodiment of the specific configuration of control unit 1. As in FIG. 7 (the third embodiment), control unit 1 is equipped with the speed correction unit 16, the difference value calculation unit 11, the differential value calculation unit 12, the multiplier 13, the adder 14, and the pinching detection unit 15. A calculation of a speed difference value and a differential of the difference value differs from that in FIG. 7. The following is a specific explanation.

Figure 10A:
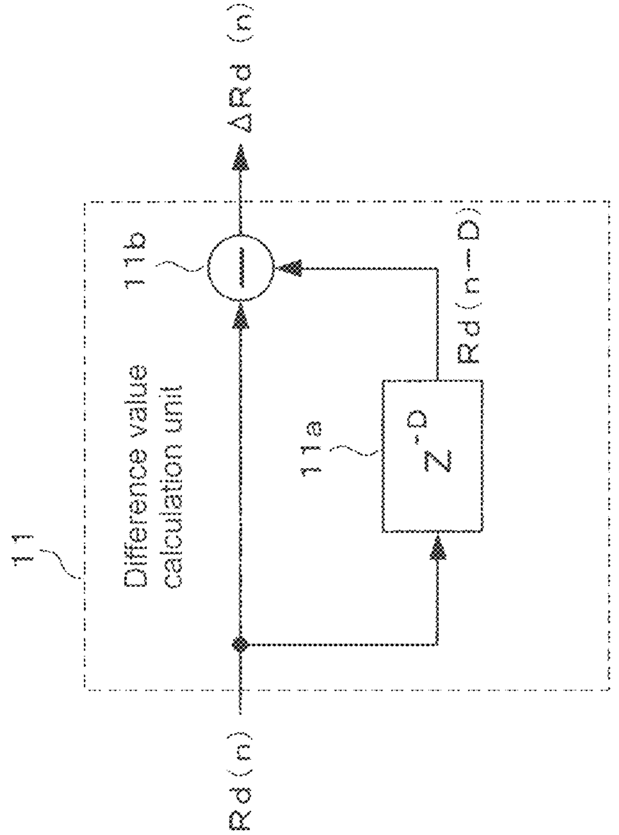
FIG. 10A is a diagram showing details of a difference value calculation unit.
Figure 10B:
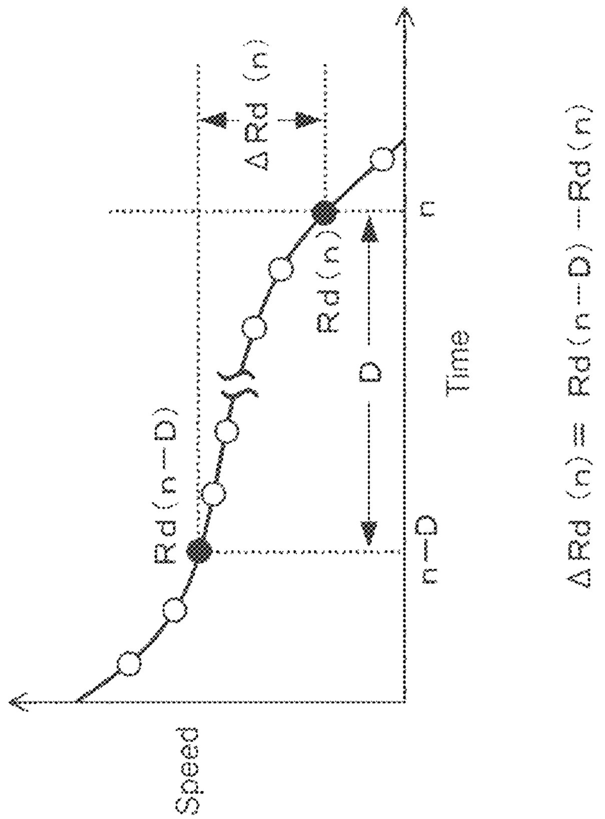
FIG. 10B is a graph showing changes in the corrected motor speed over the position of the opening/closing body.
Figure 11:
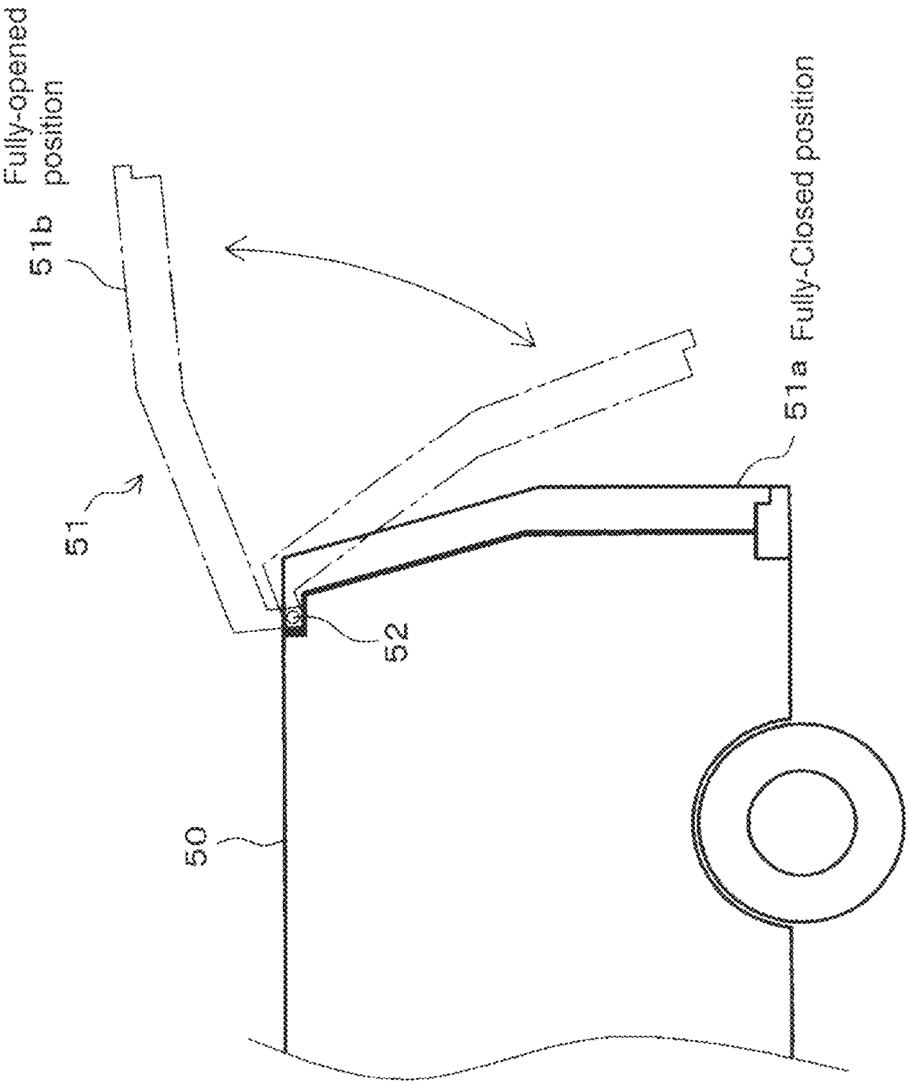
FIG. 11 is a schematic structure diagram of the back door to illustrate its operation.
Figure 12:
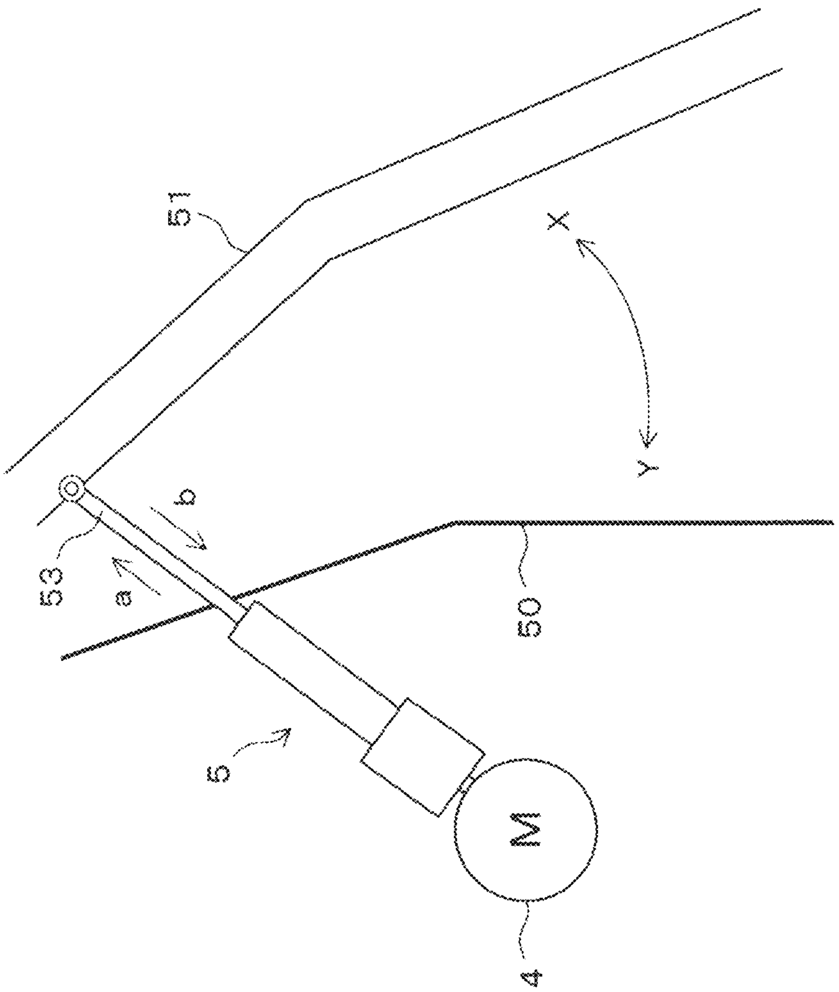
FIG. 12 is a simplified diagram of the mechanism for opening and closing the back door.
Figure 13:
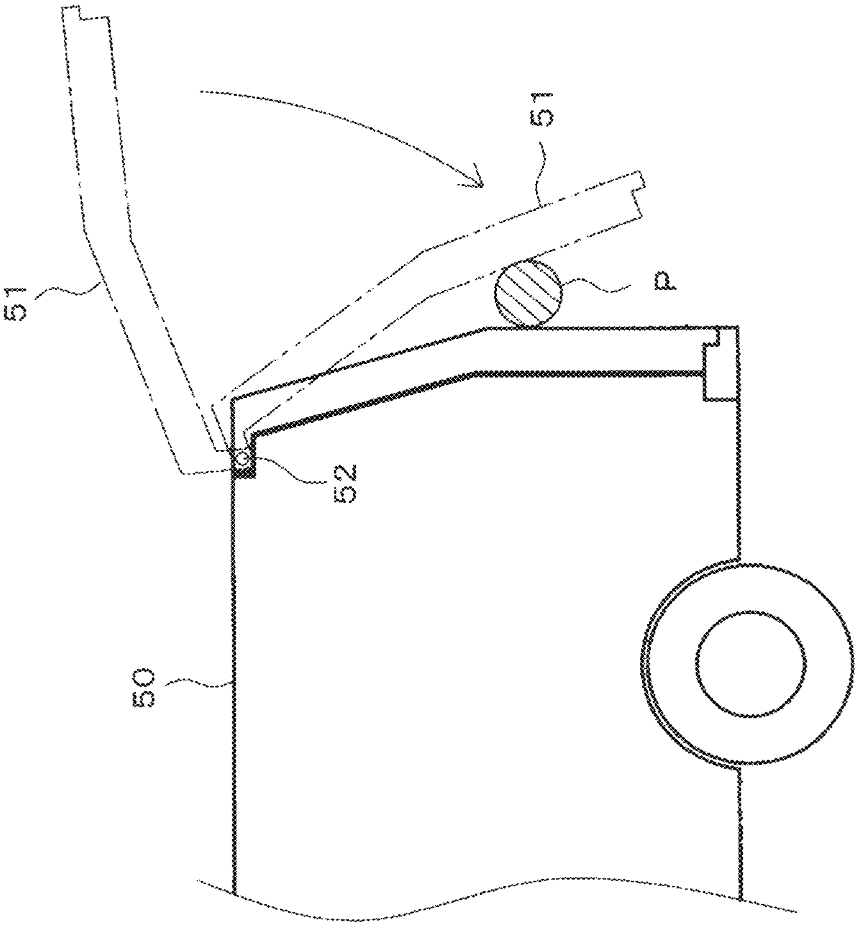
FIG. 13 is a diagram showing an example of a pinching.
Figure 14:
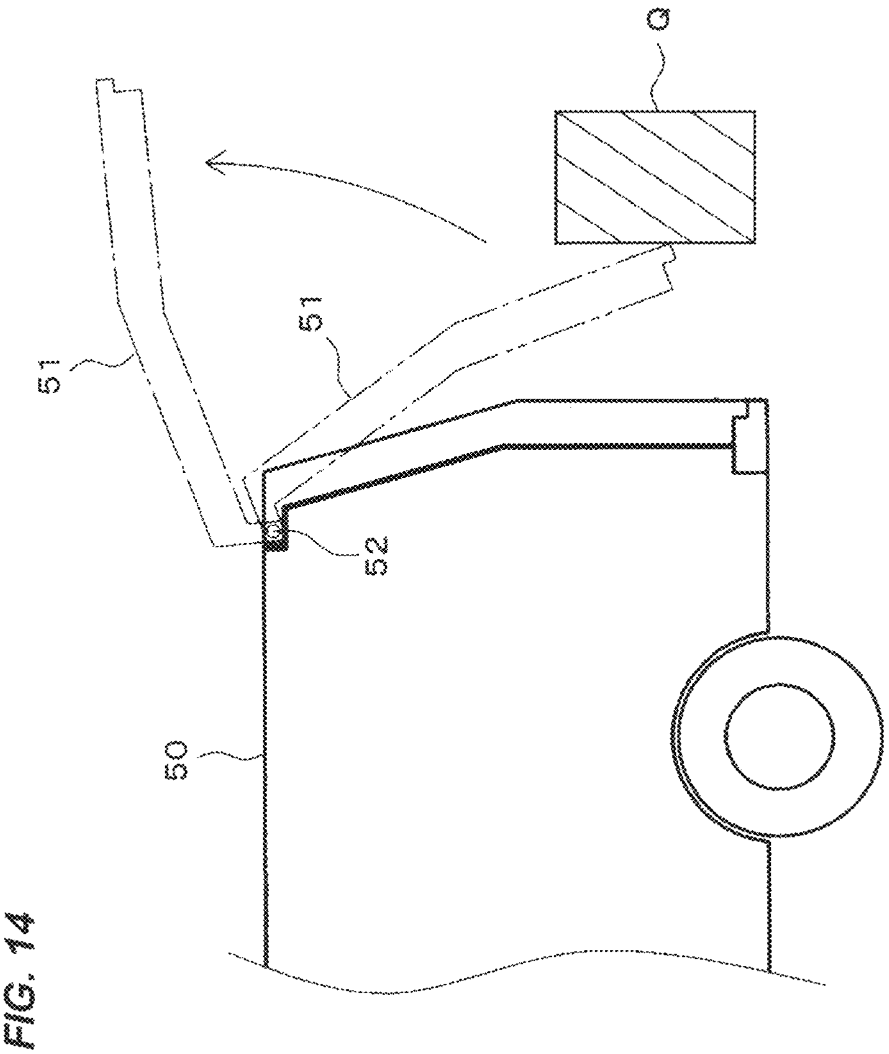
FIG. 14 is a diagram showing another example of a pinching.
Figure 15:
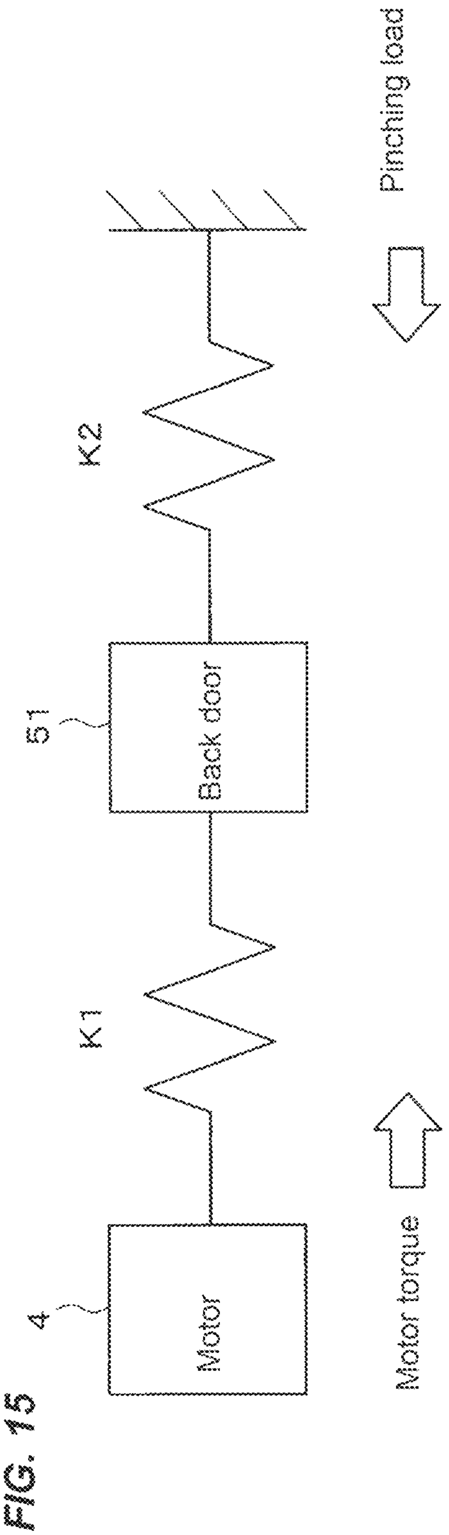
FIG. 15 is a dynamic model diagram in the case where a pinching occurs.

In FIG. 7, as explained in FIG. 8, the difference value calculation unit 11 calculated the speed difference value ΔRd(t) by subtracting the present value Rd(t) at time t from the past value Rd(t−D) at time t−D of the corrected motor speed Rd. In contrast, in FIG. 9, as shown in FIG. 10, the difference value calculation unit 11 uses the position of the back door 51 instead of time, and subtracts the present value Rd(n) at the position n from the past value Rd(n−D) of the corrected motor speed Rd at the position n−D to obtain and calculating the difference speed value ΔRd(n). The position corresponds to a door angle of the back door 51 (a pulse counted value of the angle detection unit 8), as in the second embodiment.

In FIG. 7, the differential value calculation unit 12 differentiated the speed difference value ΔRd by the time to calculate the differential value d(ΔRd)/dt. In FIG. 9, the differential value calculation unit 12 calculates the differential value d(ΔRd)/dn by differentiating the speed difference value ΔRd by the position. Therefore, the multiplier 13 performs the operation of multiplying the differential value d(ΔRd)/dn by the coefficient 'a' (here a=1). In addition, the adder 14 performs the operation of adding the speed difference value ΔRd calculated by the difference value calculation unit 11 and d(ΔRd)/dn calculated by the multiplier 13. Therefore, the pinching detection unit 15 compares ΔRd+d (ΔRd)/dn with the threshold value Th to judge whether or not a pinching has occurred.

In the fourth embodiment as described above, as in the third embodiment, the differential value d (ΔRd)/dn of the difference value is added to the difference value ΔRd of the motor speed, whereby the added value ΔRd+d (ΔRd)/dn is calculated. The added value has a larger degree of change than the difference value ΔRd. Therefore, by comparing the added value with the threshold value Th, it is possible to detect the pinching earlier than the conventional pinching detection timing. This enables shortening of the time to detect the pinching.

As described above, the exemplary embodiment of the present invention has a difference value calculation unit 11 that calculates the difference between the present value and the past value of the current of the motor 4 or the speed of the motor 4, a differential value calculation unit 12 that calculates the differential value of the difference value calculated by the difference value calculation unit 11, and an adder 14 that adds these difference value and differential value. Then, by comparing the added value of the difference value and differential value with the threshold value Th, the presence or absence of the pinching at the back door 51 is judged. Thus, even if the back door 51 is bent due to the pinching, the presence or absence of pinching can be detected more quickly than with the conventional method of detecting the presence or absence of pinching using only the difference value.

In addition to the embodiments described above, various other embodiments can be employed in the present invention. For example, in FIG. 2 and FIG. 5, the difference value of the motor current and the differential value were added, and the added value was compared with a threshold value to judge whether or not a pinching has occurred. In contrast, a motor torque can be used instead of the motor current. In other words, when "the motor torque=the motor current×a torque constant" is established, the motor torque is proportional to the motor current. Therefore, instead of the difference value of the motor current, the difference value of the motor torque can be calculated, and the value obtained by adding the difference value and the differential value can be compared with the threshold value to judge whether or not pinching occurs.

In the above mentioned example, a motor 4 is provided for the back door 51. The motors may be provided for both a left side and a right side of the back door 51. In this case, the back door control device 100 is provided for each motor. If both the right side and the left side of the back door 51 are driven by each motor, the amount of the bend of the back door 51 when pinching occurs will be reduced compared to when only one side is driven by a motor, but the bend will still occur.

Furthermore, in the embodiments described above, the back door of a vehicle was used as an example of an opening/closing body. The present invention can be applied to a rotary type open/close body other than back doors, as long as one end is supported by a rotating shaft and rotated around the shaft by a motor. For example, the invention can be applied to the control of a rotary gate installed in a garage.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An opening/closing control device comprising:

a motor drive unit that drives a motor to open and close an opening/closing body, a control unit controls an operation of the motor drive unit, the control unit includes:

a difference value calculation unit calculates a current difference value, which is a difference between a present value and a past value of a motor current flowing in the motor, a differential value calculation unit calculates a differential value of the current difference value calculated by the difference value calculation unit, an adding unit adds the current difference value and the differential value, a pinching detection unit that judges whether or not there is a pinching at the opening/closing body based on the result of a comparison between an added value calculated by the adding unit and a predetermined threshold value.

2. An opening/closing control device comprising:

a motor drive unit that drives a motor to open and close an opening/closing body, a control unit controls an operation of the motor drive unit, the control unit includes:

a difference value calculation unit calculates a speed difference value, which is the difference between a present value and a past value of a motor speed, a differential value calculation unit calculates a differential value of the speed difference value calculated by the difference value calculation unit, an adding unit that adds the speed difference value and the differential value, a pinching detection unit that judges whether or not there is a pinching at the opening/closing body based on the result of a comparison between an added value calculated by the adding unit and a predetermined threshold value.

3. The opening/closing control device according to claim 1, wherein the adding unit adds the current difference value and the differential value multiplied by a predetermined coefficient.

4. The opening/closing control device according to claim 1, wherein the differential value is a differential value obtained by differentiating the current difference value by time, or a differential value obtained by differentiating the current difference value by a position of the opening/closing body.

5. The opening/closing control device according to claim 1, wherein instead of the motor current, a motor torque, which is proportional to the motor current, is used, the pinching detection unit judges the presence or absence of pinching by comparing a difference value of the motor torque and its differential value, which are added, with a threshold value.

6. The opening/closing control device according to claim 2, wherein the adding unit adds the speed difference value and the differential value multiplied by a predetermined coefficient.

7. The opening/closing control device according to claim 2, wherein the differential value is the differential value obtained by differentiating the speed difference value by time, or the differential value obtained by differentiating the speed difference value by a position of the opening/closing body.

8. The opening/closing control device according to claim 1, wherein the opening/closing body is a rotary opening/closing body that is supported at one end on a rotary shaft and rotated around the shaft by the motor.

9. The opening/closing control device according to claim 8, wherein the opening/closing body is a back door provided at the rear of a vehicle, the motor rotates the back door via an opening/closing mechanism connected to the back door.

* * * * *